G. A. BELL.
NON-SKIDDING DEVICE.
APPLICATION FILED NOV. 23, 1909.
966,074.
Patented Aug. 2, 1910.
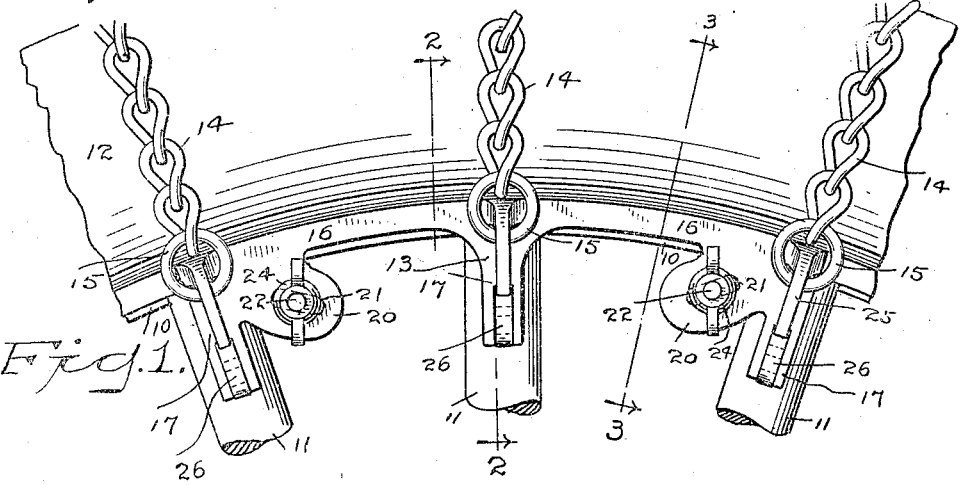
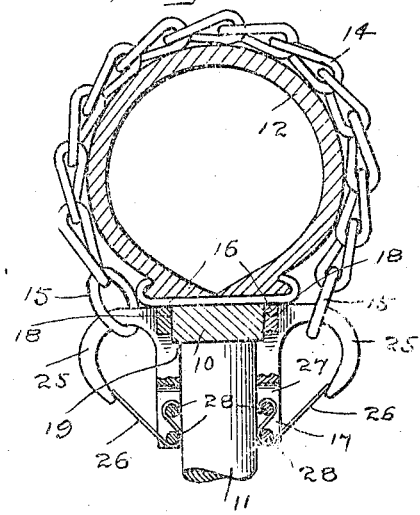
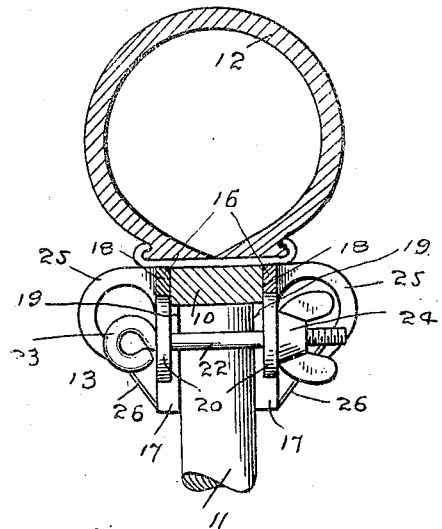
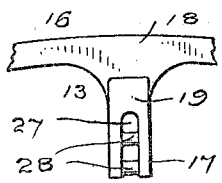
WITNESSES:
H. A. Lamb.
S. W. Atherton.
INVENTOR
George A. Bell
BY
F. Milroote
ATTORNEY

UNITED STATES PATENT OFFICE.

GEORGE A. BELL, OF NORWALK, CONNECTICUT.

NON-SKIDDING DEVICE.

966,074.  Specification of Letters Patent.  Patented Aug. 2, 1910.

Application filed November 23, 1909. Serial No. 529,552.

*To all whom it may concern:*

Be it known that I, GEORGE A. BELL, a citizen of the United States, residing at Norwalk, county of Fairfield, State of Connecticut, have invented an Improvement in Non-Skidding Devices, of which the following is a specification.

This invention has for its object to provide a simple and inexpensive non-skidding device adapted for use upon pneumatic vehicle wheels generally and especially adapted for use upon automobile wheels which shall comprise brackets detachably secured to the wheel but adapted to remain permanently in place thereon and cross chains detachably secured to the brackets, thus making the detachable parts relatively light, easy to carry and easy to attach and detach without the use of any tools whatever.

With these and other objects in view I have devised the simple and novel non-skidding device which I will now describe, referring to the accompanying drawing forming a part of this specification and using reference characters to indicate the several parts.

Figure 1 is a side elevation of a portion of an automobile wheel illustrating the application thereto of my novel non-skidding device; Fig. 2 a transverse section on the line 2—2 in Fig. 1 looking in the direction of the arrows; Fig. 3 a transverse section on the line 3—3 in Fig. 1 looking in the direction of the arrows, the chain being omitted; and Fig. 4 is an elevation of a portion of a bracket detached.

My novel non-skidding device comprises a pair of brackets adapted to lie on opposite sides of the felly, means for detachably securing the brackets in place, a plurality of chains and means for detachably securing the chains to the brackets. The brackets may be adapted to carry either three or four chains, as preferred. Upon an ordinary twelve-spoke wheel, four pairs of brackets each carrying either three or four chains, as preferred, may be used. In the drawing, I have illustrated a three-chain bracket.

10 denotes the felly of a wheel, 11 the spokes, and 12 a pneumatic tire. These parts may of course be of the ordinary or any preferred construction.

13 denotes my novel brackets which are interchangeable and 14 the chains. Any ordinary or preferred style of chain may be used, it being simply required that the ends of the chains be adapted for convenient attachment to the brackets. I have therefore shown the chain ends as provided with rings 15. Each bracket comprises a body 16 curved longitudinally to correspond with the curvature of the felly of a wheel and provided with arms 17 lying at an angle corresponding with the angle of the spokes, the body being provided with a bearing surface 18 adapted to lie closely in contact with the outer face of the felly and the arms being provided with bearing surfaces 19 adapted to lie in contact with the sides of the spokes. The brackets are provided with ears 20 provided with openings 21 which are preferably elongated in order to receive attaching bolts 22 freely and make the brackets interchangeable. The attaching bolts are provided with suitable heads 23 and are threaded to receive nuts 24 which are preferably wing nuts for convenience in attachment and detachment. At the upper end of each arm is a hook 25 which is adapted to receive the end link or ring of a chain which is retained therein by a retaining spring 26. As a convenient means of attaching the springs, I provide the lower ends of the arms with slots 27, each slot being provided with two cross pieces 28. One end of the spring lies in engagement with the inner side of the hook, as clearly shown in Fig. 2, the other end being passed downward around the lower cross piece, then upward and inward and curved about the upper cross piece to make it self-retaining in place without rivets or solder. When not in use, the brackets may or may not be kept upon the wheel, as preferred. Each pair of brackets is secured in place by two bolts and may be readily removed by turning off the nuts and as readily attached in place. Preferably the brackets remain upon the wheels, the chains only being removed when not required. When the chains are required it takes but a moment to attach them, it being simply necessary to spring each ring into a hook upon a bracket, the spring yielding when the hook is passed against it and then springing to place to retain the ring in the hook like an ordinary snap hook. Having attached one end of the chain, the chain is passed about the tire, as clearly shown, and the ring at the other end of the chain is snapped into engagement with a hook upon the other bracket.

Having thus described my invention I claim:

1. A non-skidding device comprising a pair of brackets each having a longitudinally curved body adapted to embrace the sides of a wheel felly, spaced apart arms extending from said body and adapted to lie along and contact with the spokes of a wheel, said arms being provided with hooks, clamping means connecting each pair of brackets, and chains removably connected at their ends to said hooks.

2. A non-skidding device comprising a pair of brackets each having a longitudinally curved body adapted to embrace the sides of a wheel felly, spaced apart arms extending from said body and adapted to lie along and contact with the spokes of a wheel, said arms being provided with hooks, slotted ears located between said arms, clamping bolts engaging oppositely disposed ears of each set of brackets, and chains removably connected at their ends to said hooks.

In testimony whereof I affix my signature in presence of two witnesses.

GEORGE A. BELL.

Witnesses:
C. OTIS FITCH,
JAY S. BUCKLEY.